(12) United States Patent
Pernyeszi

(10) Patent No.: US 9,438,123 B2
(45) Date of Patent: Sep. 6, 2016

(54) PUSH-PULL LED DRIVER CIRCUIT

(71) Applicant: Joseph Pernyeszi, Scotts Valley, CA (US)

(72) Inventor: Joseph Pernyeszi, Scotts Valley, CA (US)

(73) Assignee: General Electronics Applications, Inc., Scotts Valley, CA (US)

( * ) Notice: Subject to any disclaimer, the term of this patent is extended or adjusted under 35 U.S.C. 154(b) by 0 days.

(21) Appl. No.: 14/854,768

(22) Filed: Sep. 15, 2015

(65) Prior Publication Data

US 2016/0190939 A1 Jun. 30, 2016

Related U.S. Application Data

(60) Provisional application No. 62/053,330, filed on Sep. 22, 2014.

(51) Int. Cl.
*H05B 33/08* (2006.01)
*H02M 3/335* (2006.01)

(52) U.S. Cl.
CPC ..... *H02M 3/33507* (2013.01); *H05B 33/0815* (2013.01)

(58) Field of Classification Search
CPC .. H05B 37/02; H05B 33/08; H05B 33/0809; H05B 33/0815; H05B 33/0833; H05B 33/0842
USPC ..... 315/185 R, 200 R, 209 R, 224–226, 276, 315/291, 307, 308
See application file for complete search history.

(56) References Cited

U.S. PATENT DOCUMENTS

| 8,213,194 | B2* | 7/2012 | Koutensky | ........ | H02M 3/33523 |
| | | | | | 315/209 R |
| 8,581,515 | B2* | 11/2013 | Han | .......... | H05B 33/0815 |
| | | | | | 315/185 R |

* cited by examiner

*Primary Examiner* — Jimmy Vu
(74) *Attorney, Agent, or Firm* — Davis Wright Tremaine LLP

(57) ABSTRACT

Push-pull circuits are described that are suitable for the driving of LEDs and that reduce the voltage stress on the switching transistors that is caused by the output transformer. The push-pull arrangement caters to reducing the size of the transformer as it eliminates the DC magnetic bias of the transformer core and it also caters to the integration of the semiconductor content of the circuit requiring only low side DMOS to be implemented in the monolithic, junction isolated process.

17 Claims, 6 Drawing Sheets

PUSH-PULL LED DRIVER CIRCUIT

CROSS-REFERENCE TO RELATE APPLICATION

This application claims priority from U.S. Provisional Application No. 62/053,330, filed on Sep. 22, 2014, which is hereby incorporated in its entirety by this reference.

BACKGROUND

This application relates to LED drivers.

LED (light emitting diode) drivers and other similar applications often have very small size to fit into the limited space available for the circuit. Components that take up a large space in such applications are the transformer and electrolytic capacitors. The circuit should also have high efficiency to reduce the amount of heat generated that is difficult to get rid of due to the small volume. Previous applications have typically used bulky heat sinks and a large housing for the LED drive electronics, making the lamp impractical for applications such as in chandeliers. The lamp was an esthetically poor substitute for the standard tungsten bulbs and the expected lamp life was much shorter than what could be expected from an LED lamp, due to some components failing as a result of elevated operating temperature and the use of some inherently unreliable components.

SUMMARY

A driver circuit connectable to a load, such as a stack of LEDs, and includes a DC supply node, such as can come from a bridge rectifier connected to an 115V or 220V AC power supply, first and second switches, a rectifier, and a transformer. The transformer has first and second primary windings and a secondary winding. The first and second primary windings are respectively connected to ground through the first and second switches and have a center tap connected to the DC supply. The secondary winding is connected to the load through the rectifier when the driver circuit is connected to drive the load. Control circuitry is connected to the first and second switches, whereby the first and second transistors are alternately conducting when driving the load. The driver circuit is connected to drive the load, the load is connected in parallel with the first rectifier and is also connected in series with the first and second switches between the DC supply node and ground through the center tap.

Various aspects, advantages, features and embodiments are included in the following description of exemplary examples thereof, which description should be taken in conjunction with the accompanying drawings.

DETAILED DESCRIPTION

The following relates to push-pull circuits that reduce the voltage stress on the switching transistors that is caused by the output transformer. The push-pull arrangement caters to reducing the size of the transformer, as it eliminates the DC magnetic bias of the transformer core, and it also caters to the integration of the semiconductor content of the circuit. An exemplary circuit uses a low side DMOS can be implemented in the monolithic, junction isolated process.

Figure 1:
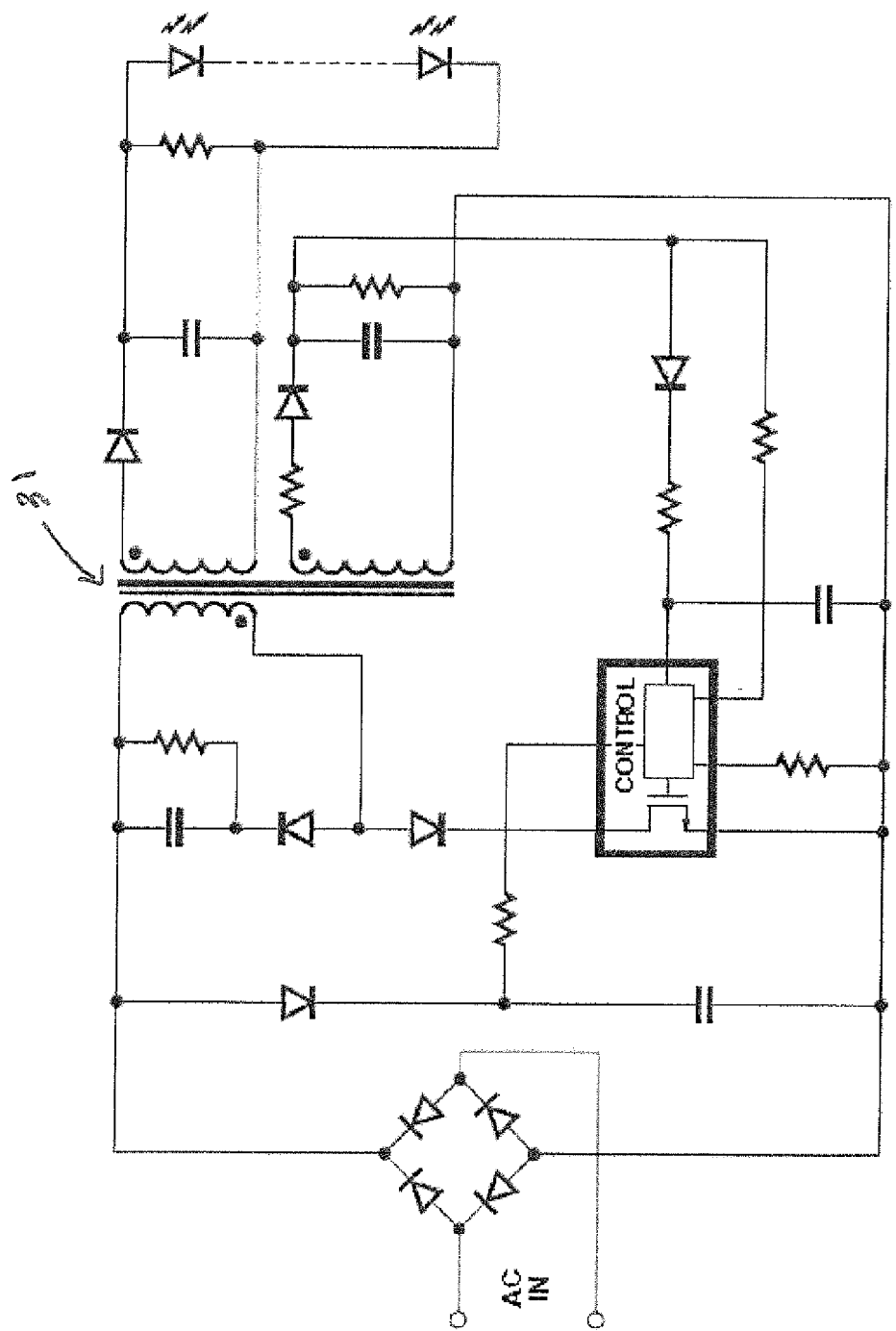
FIG. 1 shows an example of an LED driver circuit with the magnetic core having a DC bias.

Small DC/DC converters, such as the ones used in LED drivers, normally use a flyback or buck topology. FIG. 1 shows an example of an LED driver circuit with the magnetic core 31 having a DC bias. These converter topologies subject the transformer or inductor to a DC bias which uses larger magnetic components as compared to transformers that do not have DC bias.

Figure 2:
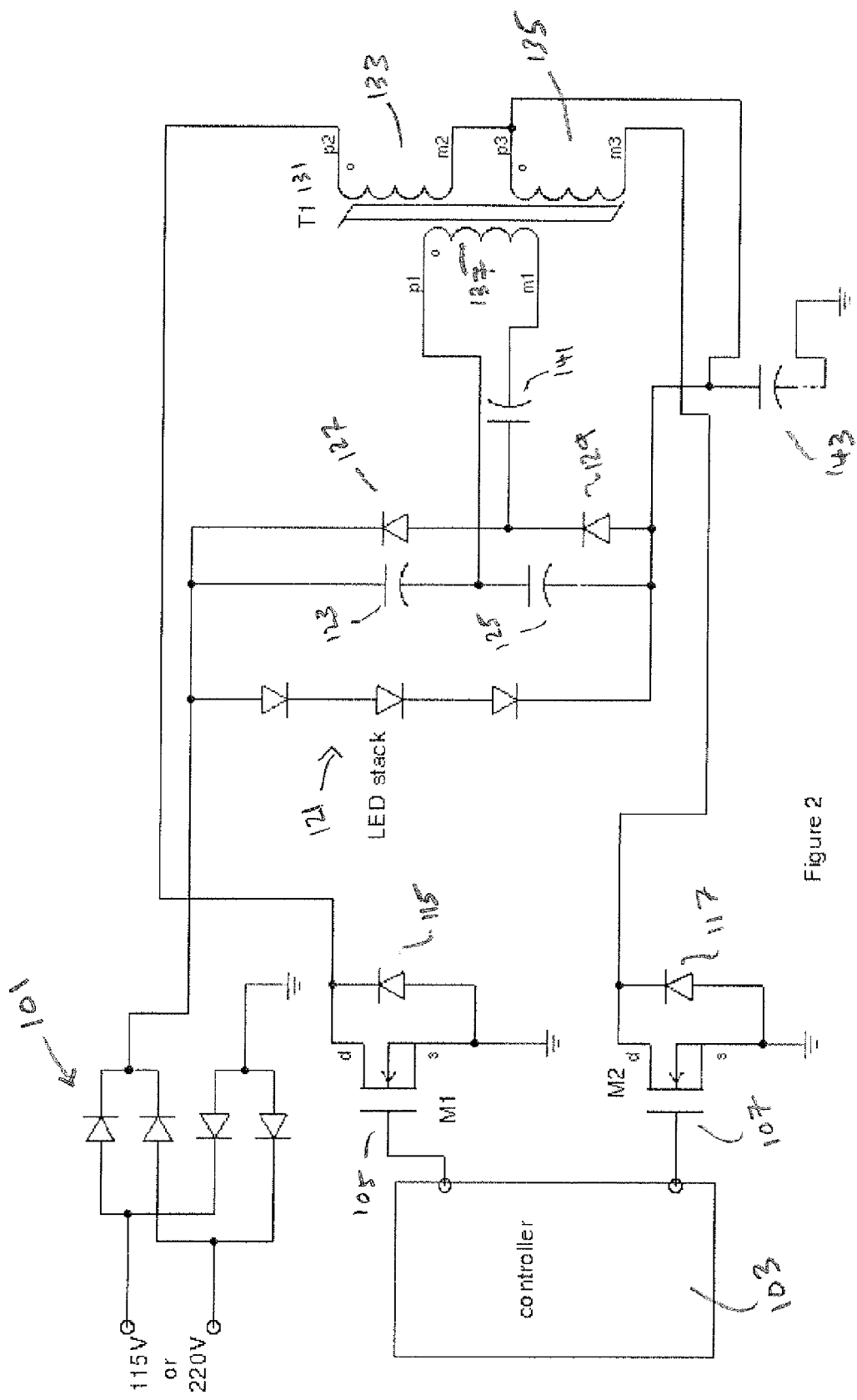
FIG. 2 shows a push-pull driver circuit LED driver circuit.

FIG. 2 shows a first example of a small size push-pull driver circuit LED driver circuit. In this example, transformer T1 131 has 3 windings, two primary windings 133 and 135 respectively connected to switches M1 105 and M2 107, here implemented as DMOS transistors, and the center tap is connected to a DC supply through the load. In this example, the DC supply node is from a bridge rectifier that can be connected to an AC voltage source, such as a common 115V of a 220V AC supply. The secondary 137 is connected to a circuit that supplies power to the load through a rectifier. In this example the load is a stack 121 of LEDs connected in parallel with the capacitors 123 and 125, whose intermediate node is connected to the secondary 137 at the terminal p1, and with the diodes 127 and 129, whose intermediate node is connected to the secondary 137 at the terminal n1 through capacitor 141, forming a resonant circuit. The lower ends of these parallel connections are then connected to ground through a capacitor 143. Under this arrangement, the transformer has no DC bias and that the current for the load is that of the converter (including the two DMOS transistors, transformer, a series inductor, output diodes and capacitors) output current and the transformer input current. (As discussed below with respect to FIG. 6, the load can alternately be placed into the common source connection of the switches.)

Since the load 121 of FIG. 2 is connected between the positive supply and the center tap of the transformer, current into the circuit will go through the load such that current for the load comprises of the sum of the currents coming from the secondary 137 of the transformer and the current going into the center tap of the transformer. The transistors M1 105 and M2 107 can be implemented as DMOSs, which can be respectively connected in parallel with diodes 115 and 117. (The diodes 115 and 117 can be left out with careful design of the DMOS gate drive timing.) Relative to other topologies used in driver circuits, the arrangement of FIG. 2 allow for the DMOSs with a reduced breakdown voltage.

The transistors M1 105 and M1 107 are conducting alternately so that the current is flowing in the upper part 133 (p2, m2, winding) while M1 105 is conducting and in the lower part 135 (p3, m3, winding) while M1 107 is conducting. This alternating current drive results in no DC bias on the transformer core 139, allowing the core's B-H curve to be utilized fully, from the [−Bm;−Hm] point to the [+Bm;+Hm] point. This extended utilization of the B-H curve allows the transformer to be less than half the size of what is typically used for flyback or buck topologies. The circuit uses the resonant topology which takes advantage of the non-ideal coupling between the primaries and the secondary of the transformer and also reduces the switching losses. The peak drain voltage to M1 105 and M1 107 are reduced by connecting the load between the DC source and the center tap of the transformer.

By way of example, using a 220 VAC input can provide a 310V peak DC output. Assuming an LED stack of 50V, the center tap will only receive 260V in the worst case, so the peak drain voltage will be 520V. LED stacks are available with higher voltages, such as 100-150V, and can be used with the 220 VAC input, reducing the peak voltage on the DMOS switches M1 105 and M2 107 to about 300V. Since the resonant converter works without creating unwanted peak voltages, unlike the flyback converter, a commonly available 700V BCD technology is sufficient for a monolithic solution, having the controller 103 along with the two DMOS transistors inside a single chip for a 50V LED stack, and a 400V BCD process is sufficient for a 150V LED stack.

While the connection of the load in series with the DC supply conveniently reduces the maximum voltage to the DMOS switches, it also enhances the current supplied to the load. The load current has two components, the first component being the output of the resonant converter and the other current component being the supply current to the resonant converter. Due to the aforementioned feature of the circuit, the resonant converter supplies only part of the load current and therefore the transformer size can be smaller than if the full load current had to be derived from the resonant converter. The output uses two diodes (127, 129) in a quasi-voltage doubler configuration which allows two small, low voltage electrolytic capacitors (123, 125) to be used as output filter. The, in this example, 500 nF capacitor 143 provides a low impedance path for the high frequency current to ground and reduces any EMI (electromagnetic interference) generated, while it is small enough that it allows the circuit to have high power factor. Since there are no high voltage electrolytic capacitors in the circuit, the long term reliability is greatly improved while the size of the circuit is at minimum. Both voltage and current regulation is possible with this topology, depending on the design of the controller.

Figure 3:
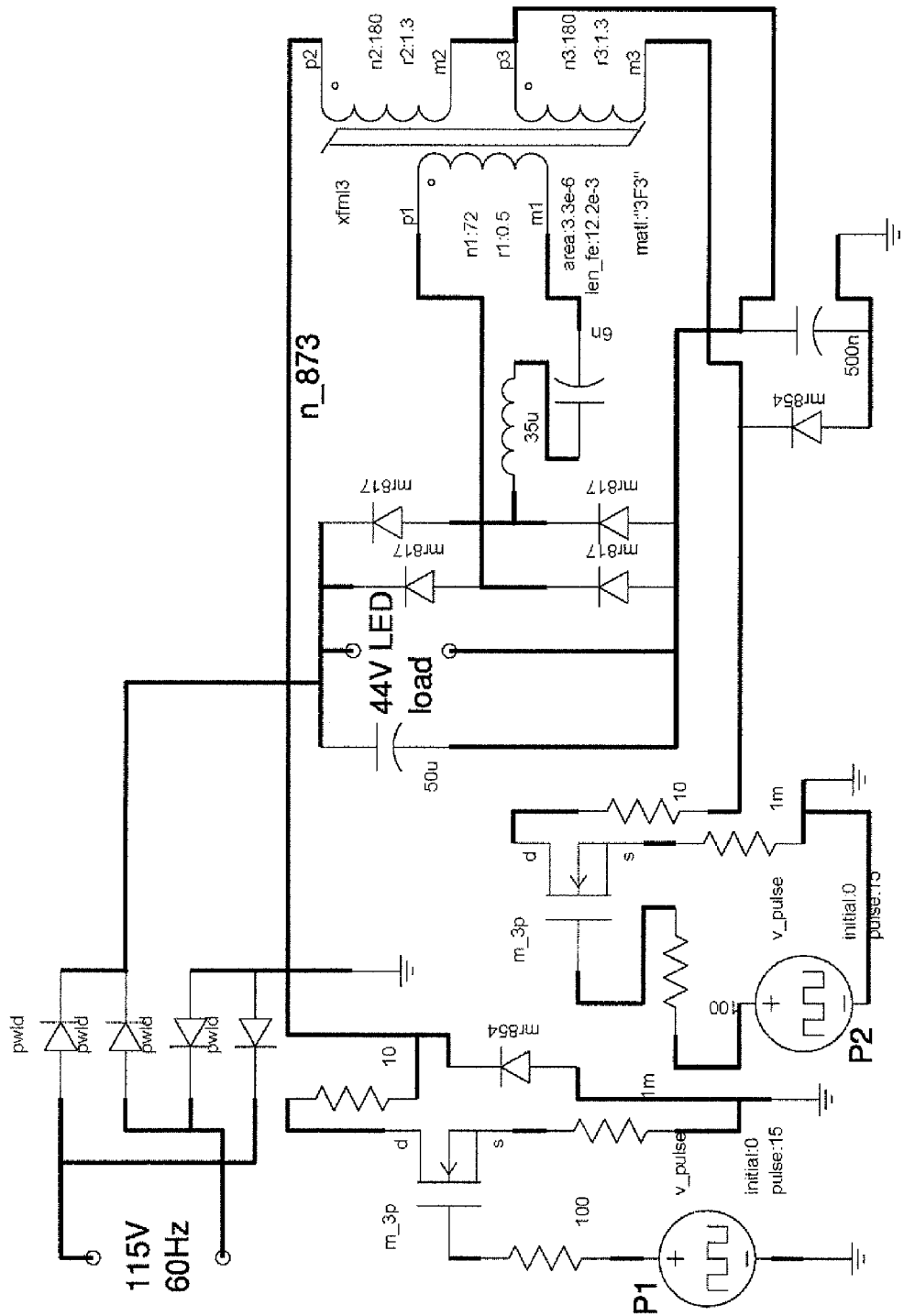
FIG. 3 shows a practical implementation of the concepts described in a circuit used for computer simulation.

FIG. 3 is a schematic of a circuit that can be used for a demonstrative computer simulation of the principle of using the concept of push-pull driving of the transformer and routing the supply current through the load which increases the efficiency of the circuit as it reduces the power demand from the resonant converter and, at the same time, reduces the voltage across the DMOS switches. P1 and P2 are pulse generators to drive the control gates of the DMOS devices M1 and M1 and substitute for the control circuit 103 of FIG. 2 for the circuit simulation. The load is a 44V LED stack. The operating frequency of the circuit in this example is 166.66 kHz, chosen as it is a commonly used frequency in LED lighting. The R_on of the DMOS switches is precisely emulated by using 10 Ohm resistors in each of the DMOS drains. The circuit operates from the standard US power of 115V, 60 Hz. The transformer has a standard E6.3 Ferroxcube core that easily fits into the small mignon lamp socket which is the standard for chandeliers and many other free standing lamps.

The peak drain voltage is 229V which requires no more than 300V breakdown voltage for the DMOS switches and allows one to use very small area transistors on the semiconductor chip, making a low cost integrated controller/switch possible. The efficiency is 89.66% which, at the 5 W output generates only 0.5 W heat, keeping the temperature of the circuit low. The low operating temperature of the lamp and the lack of unreliable high voltage electrolytic capacitors make for a long life LED lamp in the small mignon socket.

Figure 4:
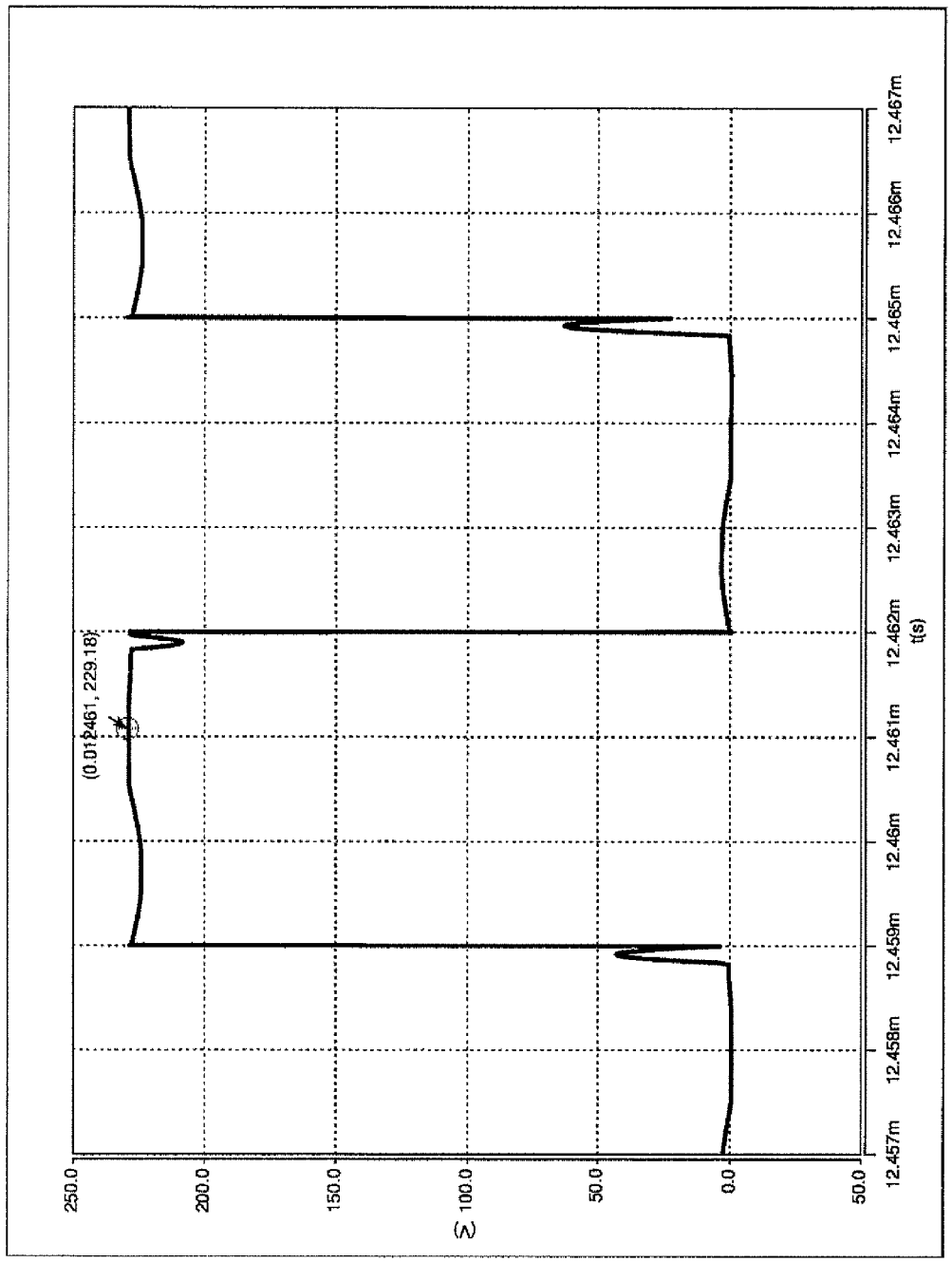
FIG. 4 shows a wave form demonstrating the reduced voltage stress on the DMOS switches of the LED driver circuit.

The wave form measured on the DMOS drain, shown in FIG. 4 demonstrates how the circuit works with low peak voltage that allows one to use a relatively low voltage BCD process, reducing the size of the DMOS transistors, which in turn reduces the cost of the control circuit/DMOS switch combination.

Figure 5:
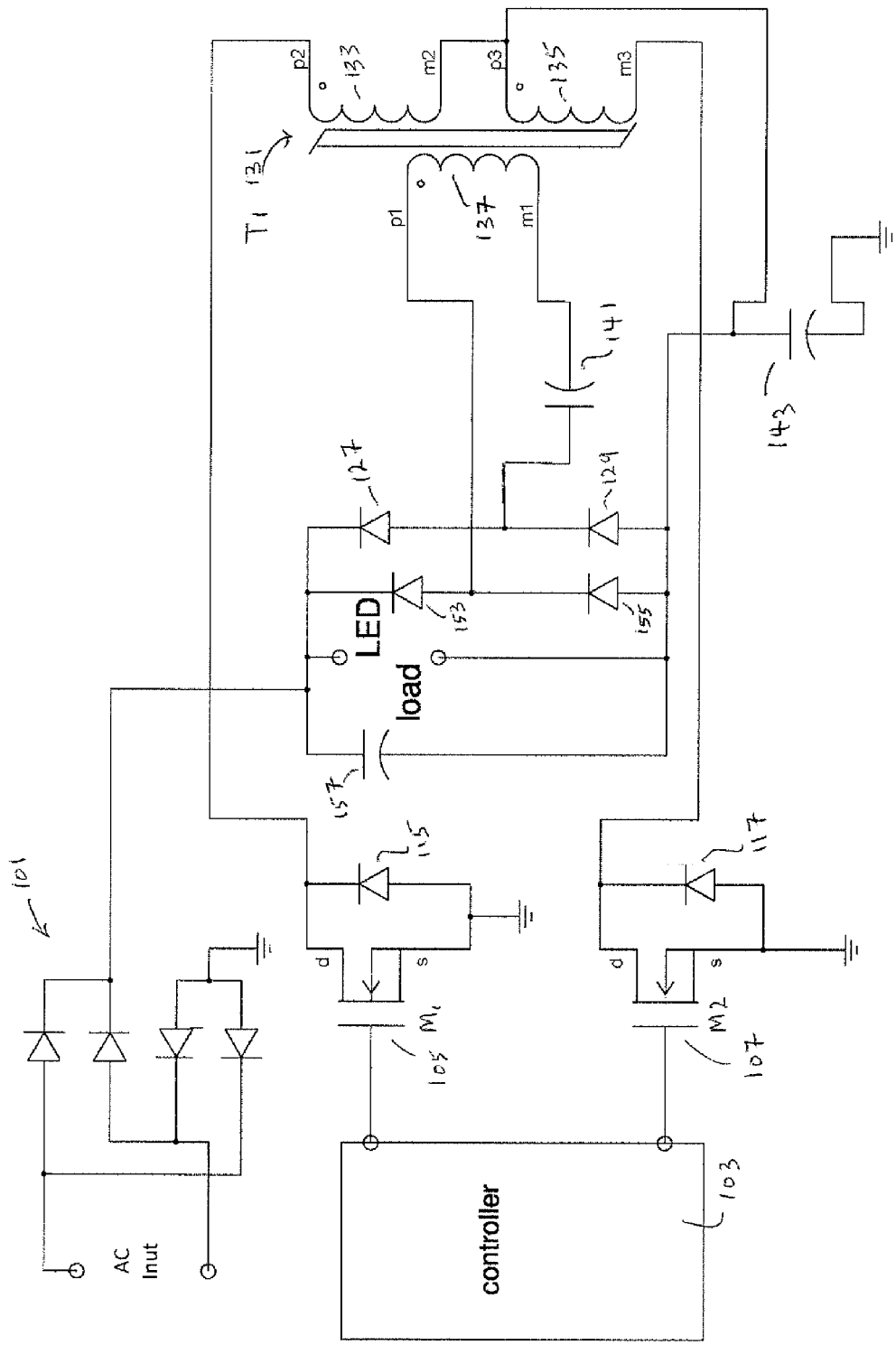
FIGS. 5 and 6 show alternate variations of a push-pull driver circuit LED driver circuit.
Figure 6:
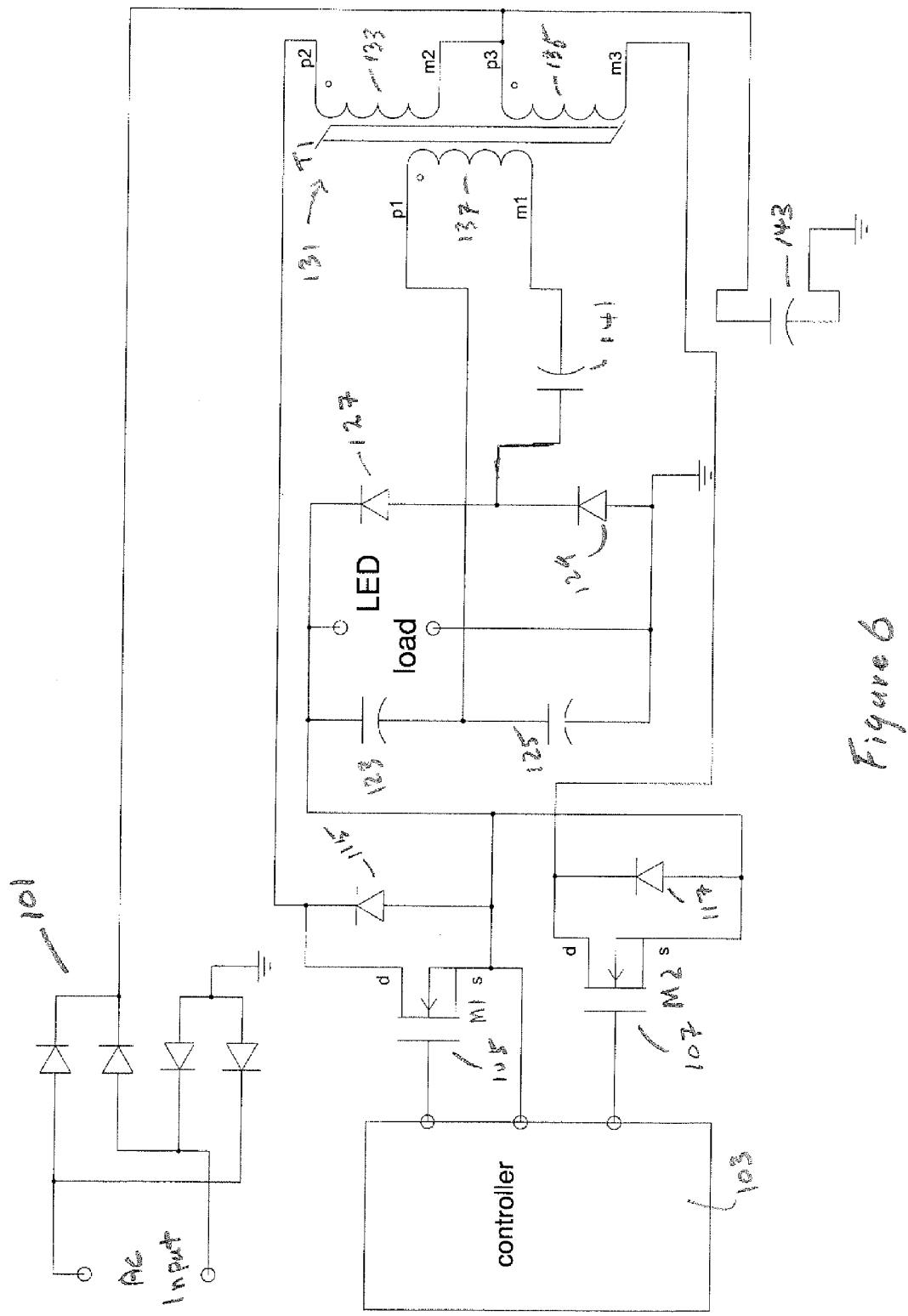

A number variations are possible, two examples of which are shown in FIGS. 5 and 6. As with the embodiment of FIG. 2, these variations again have no DC bias on the transformer core and connect the converter input and the output in series so that the load current is made up of these two components.

Relative to FIG. 2, the capacitors 123 and 125 have been replaced with the diodes 153 and 155, with the capacitor 157 also connected in parallel with the load. In either case, the output from the transformer is an AC signal that swings positive and negative with respect to the output terminal connected to the junction of 123 and 125 (in FIG. 2) 153 and 155 (in FIG. 5). In the rectifier of FIG. 2, the diode 127 conducts and charges capacitor 123 during the positive swing of the output signal, while during the negative swing diode 129 charges capacitor 125. The way the diodes are connected results in a negative charge on the bottom plate of 125 and a positive charge on the top plate of 123. The load, being connected between the top plate of 123 and the bottom plate of 125, will see the voltage which is the sum of the two capacitor voltages. In arrangement of FIG. 5, the use of the diode bridge acts as the rectifier so the capacitor 157 is charged on both the positive swing of the output and the negative swing.

In FIGS. 2 and 5, the center tap of the transformer T1 131 is connected to the DC supply though the load and, in parallel with the load, the rectifier elements of 123, 125, 127, 129 (in FIG. 2) or 127, 129, 153, 155, 157 (in FIG. 5); and the center tap of the transformer T1 131 is connected through the primary windings 133, 135 and switches 105, 107 to ground. The example of FIG. 6 uses the same rectifier elements in parallel with the load as in FIG. 2, but places these elements differently. In FIG. 6, the load is again connected in series with the switches (M1 105, M2 107) between the DC supply from 101 and ground through the center tap of the transformer T1 131, but the location of the load is changed. In FIG. 6, the DC supply is connected to the center tap without going through the load. The load (and parallel connected rectifier elements 123, 125, 127, 129) are now between the sources of the DMOS switches M1 105 and M2 107 ground. Under either arrangement, the converter input terminals (the center tap of transformer and the common DMOS source terminals) are in series with the load, only the order is changed.

The foregoing detailed description has been presented for purposes of illustration and description. It is not intended to be exhaustive or to limit the above to the precise form disclosed. Many modifications and variations are possible in light of the above teaching. The described embodiments were chosen in order to explain the principals involved and its practical application, to thereby enable others to best utilize the various embodiments and with various modifications as are suited to the particular use contemplated. It is intended that the scope be defined by the claims appended hereto.

It is claimed:

1. A driver circuit connectable to a load, comprising:
    a DC supply node;
    first and second switches;
    a first rectifier;
    a transformer having first and second primary windings and a secondary winding, wherein the first and second primary windings are respectively connected to ground through the first and second switches and have a center tap connected to the DC supply node, and wherein the secondary winding is connected to the load through the first rectifier when the driver circuit is connected to drive the load; and control circuitry connected to the first and second switches, whereby the first and second switches are alternately conducting when driving the load, wherein, when the driver circuit is connected to drive the load, the load is connected in parallel with the first rectifier and is connected in series with the first and second switches between the DC supply node and ground through the center tap.

2. The driver circuit of claim 1, wherein the center tap is connected to the DC supply node through the load when the driver circuit is connected to drive the load.

3. The driver circuit of claim 1, wherein the first and second switches are connect to ground through the load when the driver circuit is connected to drive the load.

4. The driver circuit of claim 1, wherein the load is one or more LEDs connected in series.

5. The driver circuit of claim 1, wherein, when the driver circuit is driving the load, current through the load is a sum of a current from the secondary winding and a current into the center tap.

6. The driver circuit of claim 1, wherein the first rectifier includes:
first and second series connected capacitors having an intermediate node connected to a first terminal of the secondary winding; and
first and second series connected diodes having an intermediate node connected to a second terminal of the secondary winding.

7. The driver circuit of claim 6, wherein the first and second series connected diodes are connected to the second terminal of secondary winding through a third capacitor forming a resonant circuit.

8. The driver circuit of claim 1, wherein the first rectifier includes:
first and second series connected diodes having an intermediate node connected to a first terminal of the secondary winding; and
third and fourth series connected diodes having an intermediate node connected to a second terminal of the secondary winding.

9. The driver circuit of claim 8, further comprising:
a capacitor connected in parallel with the first and second series connected diodes and with the third and fourth series connected diodes.

10. The driver circuit of claim 8, wherein the third and fourth series connected diodes are connected to the second terminal of secondary winding through a third capacitor forming a resonant circuit.

11. The driver circuit of claim 1, wherein the driver circuit further includes a second rectifier connected between the DC supply node and ground and connectable to an AC voltage source.

12. The driver circuit of claim 1, wherein the first and second switches are implemented as DMOS transistors.

13. The driver circuit of claim 1, wherein each of the first and second switches is respectively connected to ground in parallel with a corresponding one of a first diode and a second diode.

14. The driver circuit of claim 1, wherein the control circuitry uses a voltage based regulation.

15. The driver circuit of claim 1, wherein the control circuitry uses a current based regulation.

16. The driver circuit of claim 1, wherein the center tap is connected to ground through a capacitor.

17. The driver circuit of claim 1, wherein the control circuitry and first and second switches are formed on a common integrated circuit.

* * * * *